Dec. 23, 1952 D. A. STARK 2,622,611
PRESSURE REGULATOR
Filed Sept. 7, 1946 2 SHEETS—SHEET 1

INVENTOR:
DONALD A. STARK
BY: Roland C. Rehm
ATTORNEY

Dec. 23, 1952  D. A. STARK  2,622,611
PRESSURE REGULATOR
Filed Sept. 7, 1946  2 SHEETS—SHEET 2

INVENTOR:
DONALD A. STARK
BY: Roland C Lehm
ATTORNEY

Patented Dec. 23, 1952

2,622,611

UNITED STATES PATENT OFFICE 2,622,611

PRESSURE REGULATOR

Donald A. Stark, Chicago, Ill.

Application September 7, 1946, Serial No. 695,491

7 Claims. (Cl. 137—116)

This invention relates to pressure regulators. Among other objects the invention aims to provide a pressure regulator which is simple in construction yet is reliable in operation.

The nature of the invention may be readily understood by reference to illustrative regulators embodying the invention and shown in the accompanying drawings.

Figure 1:
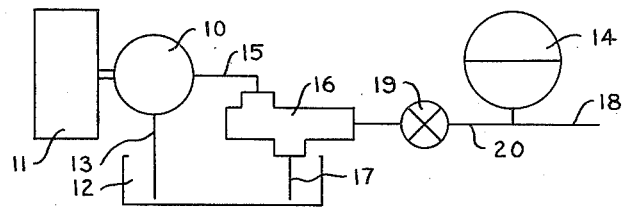
Fig. 1 is a diagrammatic view of an illustrative system employing a pressure regulator.

Pressure regulators are generally used in a fluid system which contains a pump, or pumps, which are driven (by a motor or other engine) independently of the state of the fluid system and which therefore may drive the pump at times when additional pressure fluid is not required in the system. Such a system also contains one or more accumulators which store a volume of the fluid under pressure. The pressure regulator directs the fluid from the pump into the system until a predetermined maximum pressure is reached. The regulator then directs the fluid from the pump to a storage reservoir at substantially zero pressure, the pump operating at no load. When the pressure in the system drops to a predetermined minimum, due to use or leakage of the pressure fluid stored under pressure, the regulator operates to direct the fluid from the pump into the system. Pressure regulators are often called "unloading or dump valves" inasmuch as they unload or dump the pump output into the reservoir when pressure fluid is not needed in the system.

The conventional simple pressure regulator depends for its operation on an unbalanced valve which is operated by a piston subjected to the fluid pressure in the system. Movement of the piston is resisted by the unbalance of the valve and by a spring or equivalent elastic means. The area of unbalance of the valve is less than the area of the piston, generally having 10 to 20 per cent of the area of the piston. As fluid passes from the pump to the system, the pressure in the system increases until the force it exerts on the piston is slightly in excess of the total of the resisting forces of the spring and the unbalanced valve. The piston then moves to open the valve, whereupon the fluid from the pump discharges to the reservoir at low or zero pressure and the force created by the unbalanced valve becomes correspondingly low. The system pressure acting on the piston is sufficient to overcome the spring alone, and the valve remains open. When the system pressure decreases to a predetermined minimum, the spring overcomes the pressure on the piston and the valve is closed. It is necessary that a check valve be interposed between the piston and the valve to prevent reverse flow of the fluid from the system.

Regulators of this character have not been reliable because the spring exerts an increasing force as the valve operates and an equilibrium is reached with the valve open only sufficiently to allow the fluid from the pump to escape to the reservoir at high pressure. Since no more fluid is passing into the system, there is no increase of pressure to destroy the equilibrium and the valve is "hung up," but the pump continues to operate at full load thereby wasting energy and overheating the fluid as it passes through the restricted valve.

According to the present invention faulty operation of this character is prevented by additionally conditioning the control device, here represented by the piston, to flow from the pump into the system. For example, such flow may be used to subject the pressure responsive element of the control device to a pressure slightly less than the pump pressure. As another example, the flow may be used to create a pressure difference across a piston which in turn aids the spring in resisting operation of the valve. In other words in each instance a greater net force is available to overcome the spring and valve when flow is stopped than is available while flow continues. This prevents any equilibrium or "hang up" and assures full operation of the valve to dump the pump at substantially zero pressure.

The invention is here shown embodied in regulators for use in a hydraulic system having an accumulator and served by a continuously operating pump. When the predetermined maximum pressure is reached, the regulator operates to connect the pump to discharge so that it may idle at no load. Fig. 1 illustrates diagrammatically one such system, but it will be understood that the invention is not limited in its use to any specific system. In the diagram the pump 10 continuously driven by the motor or engine 11 draws fluid from reservoir 12 through intake line 13 and delivers it to accumulator 14 through line 15 in which is interposed the regulator 16. The latter embodies a control device operating when the predetermined maximum pressure is reached to connect the pump and line 15 to discharge line 17 leading to reservoir 12. When the predetermined minimum pressure is reached the regulator operates to close the discharge line and again connect the pump to the accumulator 14 and the system. A line or lines 18 connect the pump and accumulator with the various instrumentalities in the system to be supplied with pressure fluid. A valve 19 is advantageously interposed between the pump and regulator for closing line 20 to prevent dissipation of pressure fluid from the accumulator when the regulator is removed for inspection or service.

Figure 2:
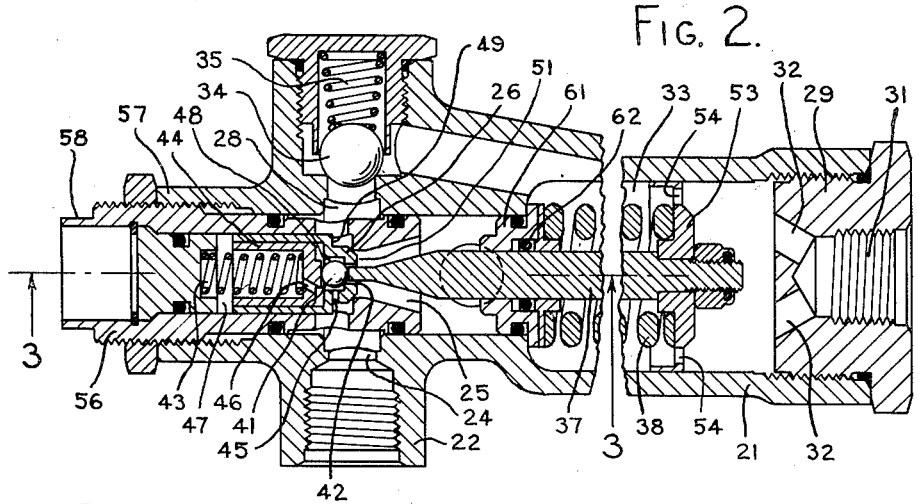
Fig. 2 is a longitudinal section through one form of regulator.
Figure 3:
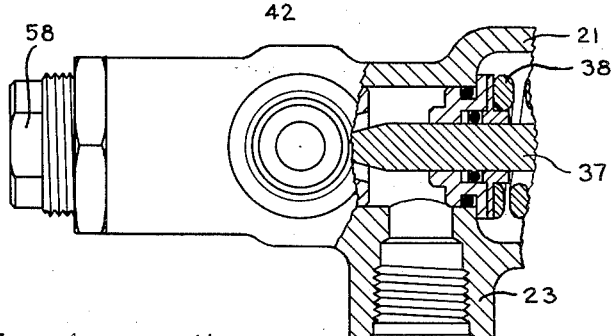
Fig. 3 is a fragmentary section of the same valve taken on the plane 3—3 of Fig. 2.
Figure 4:
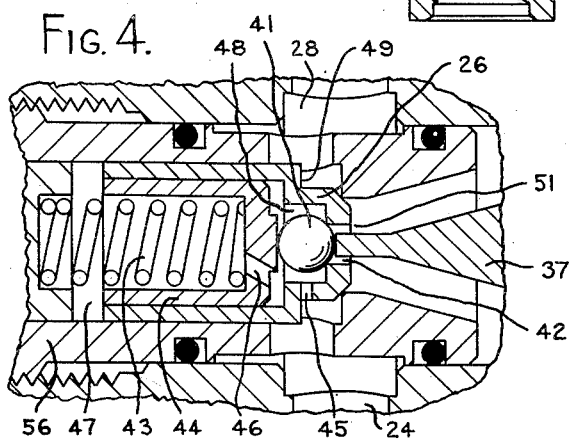
Fig. 4 is a fragmentary longitudinal section showing on an enlarged scale the pilot valve construction embodied in the assembled section of Fig. 2.

In the form of regulator illustrated in Figs. 2 to 4 the pump is connected to the regulator housing 21 at the inlet fitting 22. The reservoir is connected to the housing at the discharge outlet 23. Communication between the inlet passage 24 and the outlet 25 to the reservoir is controlled by valve 26. When opened the valve dumps the pump by connecting it directly to discharge at substantially zero pressure, and when closed it obliges the pump to discharge into the system through the passage 28 around valve 26 and communicating with inlet passage 24. The line leading to the system is in this instance connected to the accumulator housing at the fitting 29 having a passage 31 communicating through orifices 32 with passage 28 through a connecting passage 33 extending longitudinally of the regulator housing. A check valve 34 is advantageously interposed between passages 28 and 33 to prevent reverse travel of the pressure fluid when valve 26 is open or the pump is shut down or, if for any other reason, the pump pressure becomes lower than the pressure in the accumulator. The check valve is urged toward its seat by a light spring 35 which is overcome by a very slight pressure drop as the fluid flows from passage 28.

The pressure responsive device for controlling operation of the regulator is here represented by a piston or plunger 37 exposed to the pressure of the system inside the regulator housing. Movement of the piston in response to such pressure is resisted in part by spring 38.

In order to minimize the size of the spring 38 necessary to counterbalance the pressure in the system, and the corresponding size of the regulator housing, valve 26 is provided with a pilot valve of relatively small size requiring for its operation a relatively much less force than would be necessary initially to open valve 26 which is of substantial area and therefore is subjected to a substantial load by the pressure of the pump holding it on its seat. The pilot valve in this instance comprises a small ball valve 41 controlling a relatively small orifice 42 in valve 26, and urged to its seat by spring 43, which is located inside a slidable guiding sleeve 44 whose end bears against ball 41. Plunger 37 is provided with an end of reduced diameter which bears directly against ball 41 tending to unseat it. A small orifice 45 in the body of valve 26 admits pressure fluid to the interior of the valve and through a small orifice 46 in the sleeve 44 admits pressure fluid to the space 47 behind the valve, thus subjecting the valve to full pump pressure to hold it on its seat. When pilot valve 41 is unseated by the movement of plunger 37 under conditions presently described, the fluid in space 47 and that behind the valve can escape through the restricted space 48 around ball 41 and through the orifice 42. Thus valve 26 is unbalanced and the pressure on its annular surface 49 (this area comprising the diameter of the valve body minus the diameter of the tip of the valve seated in discharge orifice 51), is sufficient to open valve 26 and connect the passage 24 with discharge passage 25.

To insure complete opening of valve 26 and to prevent its hanging up as above described, movement of plunger 37 is resisted not only by spring 38 and valve 41 but by an additional force which disappears when flow from the pump to the system is discontinued, due to partial (or complete) opening of valve 26. In the present instance such additional resistance is effected by causing a pressure drop in the flow of fluid through the regulator and effective to augment the force resisting movement of plunger 37. As here shown, the plunger is provided with a supplementary piston 53 of substantial diameter, also serving as a guide for the end of plunger 37 and as a seat for spring 38, against which the pressure fluid flowing to the accumulator acts. The piston carries a plurality of orifices 54 through which the fluid passes in reaching the outlet 31. These orifices are designed to cause a slight pressure drop which is effective to resist movement of plunger 37 but which exists only so long as pressure fluid moves through the regulator housing to the system. Thus opening of pilot valve 41 and control valve 26 is resisted by spring 38, by spring 43 and the pilot valve 41 and by the pressure drop against supplementary piston 53. When these forces are overcome the pilot valve 41 is opened, with ensuing opening of control valve 26. This causes a dumping of the pump delivery into the passage 25 and the reservoir and an interruption of flow through the regulator housing and particularly through the orifices 54. Thus the fourth resisting force disappears while the plunger 37 is subjected to the same pressure force. This pressure is more than sufficient to overcome spring 38, spring 43 and the pilot valve 41 alone, and thereby causes a complete opening of pilot valve 41 and valve 26 to insure dumping of the pump discharge at substantially zero pressure.

When the pressure in the system falls to the minimum predetermined pressure there is then insufficient pressure against plunger 37 to hold open the control valve which then closes, and restores pump delivery through the regulator housing and to the system by way of outlet 31. This condition obtains until the maximum predetermined pressure is again reached which brings about opening of the regulator valve as aforesaid.

The size and number of orifices 54 in the supplementary piston 53 should preferably vary with the normal pump output so as to avoid unnecessary pressure drop at these orifices. The force created by the pressure drop through the orifices must be slightly greater than the increase of the force of springs 38 and 43 as the valve opens, so that there will not be an equilibrium of forces until the valve is completely open.

The strength of spring 38 is roughly adjusted to the maximum predetermined pressure at which the regulator is designed to operate. Fine regulation is advantageously effected in this case without opening the system or access to the interior of the regulator by mounting the control valve assembly in an adjustable housing 56 threaded into the end 57 of the regulator housing. By application of an appropriate tool to the extremity 58 of the housing 56 the latter may be screwed in or out relative to spring 38 thereby changing the deflection of spring 38 required to unseat pilot valve 41.

The forward end of the plunger 37 passes through a guide 61 provided with a simple packing or seal 62.

Figure 5:
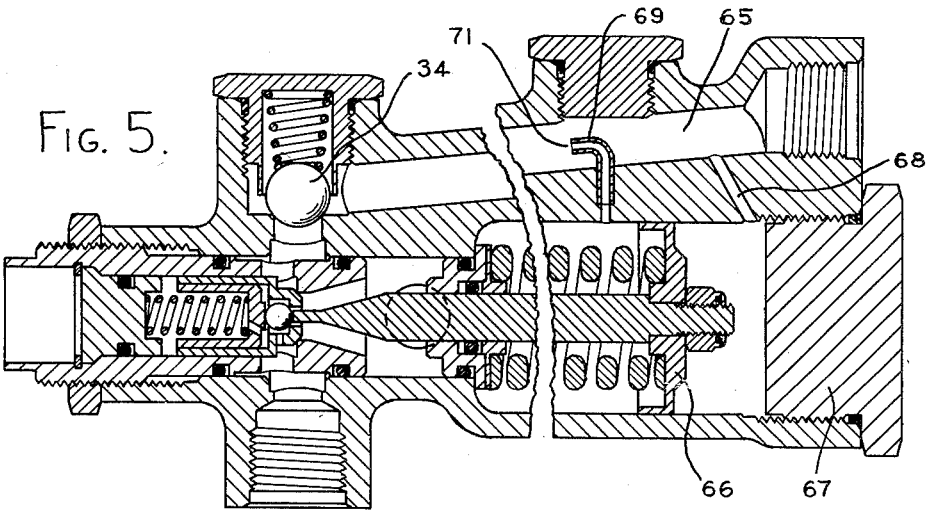
Fig. 5 is a longitudinal section similar to that of Fig. 2 showing a somewhat modified construction.

The flow of fluid from the pump to the system may be utilized to produce a force on the control device in other ways than that described above. Another means for creating a force dependent on flow is illustrated in Fig. 5. As here shown the auxiliary piston 66 is imperforate and permits no flow (with the exception of leakage around the piston) past it. The plug 67 closing the end of the regulator housing is likewise imperforate. Flow to the accumulator and the system past check valve 34 is carried directly through passage 65. One side of piston 66 is subjected to the system pressure by communicating passage 68 connected to passage 65. The other side of piston 66 is subjected to a pressure which is somewhat augmented by means of a Pitot tube 69 whose opening 71 is directed against the flow in passage 65 and communicated with the regulator housing on the aforesaid opposite side of piston 66. So long as flow continues in passage 65 the pressure on the spring side of piston 66 exceeds that on the opposite side, but when flow ceases as previously described the augmented pressure disappears. Operation of the valve is similar to that of the regulator illustrated in Fig. 2 and description thereof need not be repeated.

It should be understood that the specific design of the control valve may be substantially varied and if desired the pilot valve may be omitted. This, however, would require an appropriate redesign but the principal of operation would be the same as above described.

Figure 6:
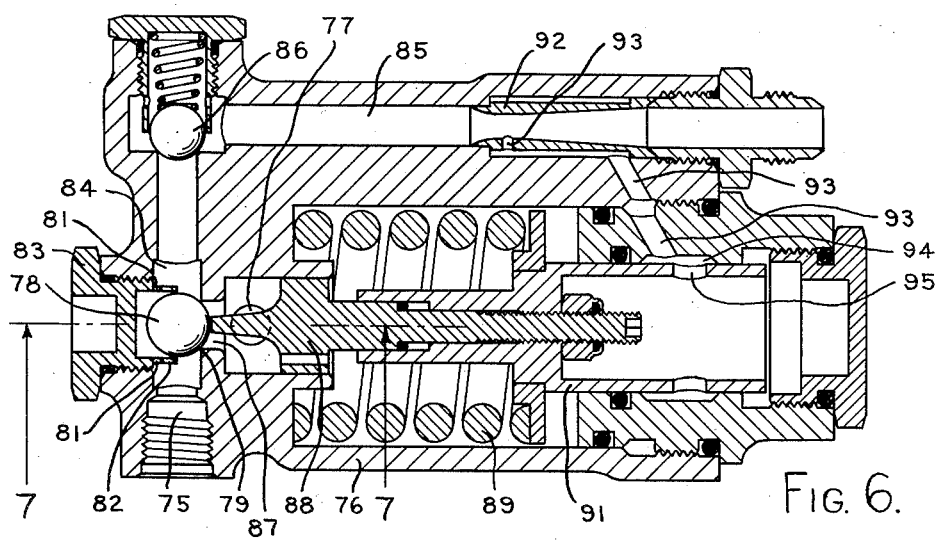
Fig. 6 is a longitudinal section of still another form of regulator valve embodying the invention.
Figure 7:
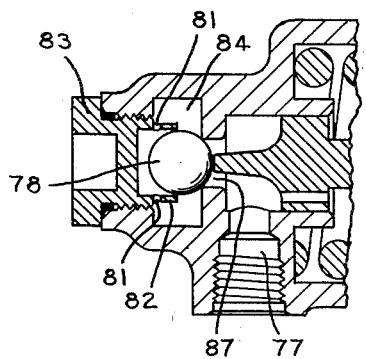
Fig. 7 is a longitudinal section of the valve taken on the plane 7—7 of Fig. 6.

Instead of using the Pitot tube or orifice to produce a pressure differential across a supplementary piston, a venturi may be used to produce a temporary reduced pressure on the main piston of plunger. Such a construction is illustrated in Figs. 6 and 7 applied to a somewhat different form of regulator. As here shown the regulator inlet 75 in the regulator housing 76 is normally cut off from communication with the discharge outlet 77 (connected to the reservoir) by means of a ball or similar valve 78. The ball is held on its seat 79 by pump pressure which bears on the opposite face of the ball and reaches it through orifices 81 in the guiding skirt 82 of the plug 83. The latter is threaded into the regulator housing and is removable to give access to the ball valve and valve seat. So long as the valve remains seated pump delivery passes through the annular passage 84 around the valve into the line 85 leading to the accumulator and the system. Interposed in the line is a check valve 86 similar to that already described and functioning as previously described to prevent reverse flow when the pump is shut down or dumping.

When valve 78 is unseated pump flow is dumped at substantially zero pressure through line 77 leading to the reservoir with which it communicates through passage 87 leading from the valve seat. The valve is controlled by a plunger 88 whose movement to unseat the valve is resisted by spring 89. Pressure is applied to plunger 88 through piston 91, but in this case the effective pressure is somewhat less than system pressure by connecting piston 91 not directly with the line 85 but indirectly thereto through a venturi 92 interposed in the line. A passage 93 leads from the throat of the venturi to the interior 94 of the regulator housing from which it gains access to piston 91 through openings 95 in the piston skirt. During flow of fluid through line 85 and the venturi 92 part of the pressure head is converted into velocity head at the throat of the venturi with the result that the unit pressure at the Venturi throat which is communicated through piston 91 is less than system pressure when there is flow in the system. When the maximum predetermined pressure is reached and valve 78 is partly unseated the flow in line 85 ceases with the result that the pressure at the throat of the venturi equals the system pressure and this is communicated to piston 91 and being greater than the pressure which inaugurated the opening of valve 78, insures its complete opening.

It will be understood that the Venturi principle may be equally applied to the type of regulator valve shown in Figs. 2 and 5. Also it will be understood that the operating mechanism of Figs. 2 and 5 may be applied to the type of control valve shown in Figs. 6 and 7.

Obviously the invention is not limited to the details of the illustrative embodiments herein shown and described. Moreover, it is not indispensable that all features of the invention be used conjointly since various features may be used to advantage in different combinations and sub-combinations.

Having described my invention, I claim:

1. A regulator for pressure fluid systems comprising in combination a valve normally biased to its closed position for controlling the supply of pressure fluid to the system and adapted when opened to by-pass fluid supply from said system, said valve having a piston exposed to fluid pressure for opening the valve, a passage for conducting pressure fluid from the regulator to the system, check valve in said passage between said first named valve and the system for preventing flow from said system on opening said first named valve resilient means tending to resist opening of said valve against the fluid pressure and yieldable at a predetermined pressure to permit opening of said valve, said passage including an orifice through said piston to produce a fluid pressure drop against said piston in aid of said resilient means, said pressure drop disappearing upon interruption of flow to increase the valve opening force.

2. A pressure regulator of the dumping type for hydraulic pressure systems supplied by continuously operating hydraulic fluid supply means comprising in combination a regulator housing having a pressure fluid chamber therein and an orifice leading to discharge, a valve port connecting said chamber with said orifice, a valve biased to close said port and adapted when unseated to connect said chamber with discharge and permit the hydraulic fluid to discharge at substantially no load through said port to said discharge orifice, valve operating mechanism including a piston adapted when moved to open said valve, a spring opposing opening movement of said piston, passages leading from said fluid supply to both sides of said piston and adapted to create a slight pressure differential on opposite sides of said piston in favor of holding said piston against valve opening movement, said pressure differential disappearing on interruption of fluid supply to said system to create an additional force for moving said valve to completely open position.

3. A pressure regulator of the dumping type for hydraulic pressure systems supplied by continuously operating hydraulic fluid supply means comprising in combination a regulator housing having a pressure fluid chamber therein and an orifice leading to discharge, a valve port connecting said chamber with said orifice, a valve biased to close said port and adapted when unseated to connect said chamber with discharge and permit the hydraulic fluid to discharge at substantially no load through said port to said discharge orifice, valve operating mechanism responsive to the pressure in said system and including a piston moved by a predetermined maximum pressure in said system to unseat said valve to connect said supply to discharge, a passage connected with the fluid pressure in said system and leading to one face of said piston to subject the same to system pressure, a spring opposing open movement of said piston and adapted to yield at said predetermined pressure, pressure reducing means between said fluid supply and said piston for exposing the latter to slightly less pressure than in said system, said reducing means being effective on opening of said valve to deliver full system pressure to said piston to insure complete opening of said valve, a check valve in said piston to prevent discharge of pressure from said system to said discharge orifice.

4. A pressure regulator of the dumping type for hyuraulic pressure systems supplied by continuously operating hydraulic fluid supply means comprising in combination a regulator housing having a pressure fluid chamber therein and an orifice leading to discharge, a valve port connecting said chamber with said orifice, a valve biased to close said port and adapted when unseated to connect said chamber with discharge and permit the hydraulic fluid to discharge at substantially no load through said port to said discharge orifice, a reciprocable valve opening member carrying a piston slidable in said regulator housing, a spring bearing against said piston in a direction to resist valve opening movement of said member, a passage in said housing for conducting pressure fluid from the system to the other face of the piston to oppose the force of said spring, said piston and spring being so proportioned that when the maximum predetermined pressure in the system is reached the fluid pressure against said piston is sufficient to start opening movement of said valve, said piston and passage operating on substantial reduction of flow into said system for augmenting the opening force of said piston to insure complete opening of said valve.

5. A pressure regulator of the dumping type for hydraulic pressure systems supplied by continuously operating hydraulic fluid supply means comprising in combination a regulator housing having a pressure fluid chamber therein and an orifice leading to discharge, a valve port connecting said chamber with said orifice, a valve biased to close said port and adapted when unseated to connect said chamber with discharge and permit the hydraulic fluid to discharge at substantially no load through said port to said discharge orifice, a reciprocable valve opening member carrying a piston slidable in said regulator housing, a spring bearing against said piston in a direction to resist valve opening movement of said member, a passage in said housing for conducting pressure fluid from the system to the other face of the piston to oppose the force of said spring, said piston and spring being designed so that when the maximum predetermined pressure in the system is reached, the fluid pressure against said piston is sufficient to start opening movement of said valve, a conduit leading from said passage to conduct fluid pressure to the spring side of said piston to augment the force of said spring against the piston, means operating during flow into said system for creating a pressure differential between the fluid pressure on opposite sides of said piston, the higher pressure in aid of said spring, said pressure difference disappearing on substantial reduction in flow in said passage to increase the valve opening force against said piston, whereby said valve is opened completely to permit discharge at low pressure from said regulator.

6. A pressure regulator of the dumping type for hydraulic pressure systems supplied by continuously operating hydraulic fluid supply means comprising in combination a regulator housing having a pressure fluid chamber therein and an orifice leading to discharge, a valve port connecting said chamber with said orifice, a valve biased to close said port and adapted when unseated to connect said chamber with discharge and permit the hydraulic fluid to discharge at substantially no load through said port to said discharge orifice, valve operating mechanism responsive to the pressure in said system and including a piston moved by a predetermined maximum pressure in said system to unseat said valve to connect said supply to discharge, a spring opposing valve opening movement of said piston, a passage connected with the fluid pressure in the system for conducting pressure fluid to the piston face opposite said spring, said piston and spring being relatively designed to result in opening of said valve upon a predetermined maximum pressure in said system, an orifice means associated with said passage and effective during flow to said system to reduce below system pressure the pressure against said piston, said orifice means being inoperative upon substantial reduction of flow to said system to effect said reduction in pressure, whereby full system pressure is effective against said system to complete opening of said valve.

7. A pressure regulator of the unloading type for hydraulic pressure systems comprising in combination a regulator housing having a valve chamber and a discharge orifice therein, a port connecting said chamber with said orifice, a valve biased to close said port, a piston operated valve opening device biased against valve opening movement, a passage leading from said chamber and adapted to be connected with said system and having a check valve therein to prevent return flow to said chamber, said passage being connected to supply pressure to both sides of said piston, the forces against said piston being effective to move the same to open the valve when a predetermined system pressure is reached, and an orifice associated with said passage through which flow reaches one face of said piston to produce a pressure drop in the pressure against the latter face of the piston, said pressure drop disappearing on interruption of flow.

DONALD A. STARK.

(References on following page)

REFERENCES CITED

The following references are of record in the file of this patent:

UNITED STATES PATENTS

| Number | Name | Date |
|---|---|---|
| 2,018,119 | Brouse | Oct. 22, 1935 |
| 2,188,463 | Mercier | Jan. 30, 1940 |
| 2,219,488 | Parker | Oct. 29, 1940 |
| 2,320,686 | Waseige | June 1, 1943 |
| 2,392,213 | Cruzan | Jan. 1, 1946 |
| 2,429,469 | Roth | Oct. 21, 1947 |

FOREIGN PATENTS

| Number | Country | Date |
|---|---|---|
| 367,284 | Great Britain | of 1932 |